(12) United States Patent
Eerola

(10) Patent No.: US 7,068,620 B1
(45) Date of Patent: Jun. 27, 2006

(54) METHOD AND APPARATUS FOR EFFICIENTLY ENCODING WIRELESS DATA PACKET HEADERS

(75) Inventor: Severi Eerola, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/979,249

(22) PCT Filed: May 22, 2000

(86) PCT No.: PCT/FI00/00461

§ 371 (c)(1),
(2), (4) Date: Nov. 20, 2001

(87) PCT Pub. No.: WO00/72537

PCT Pub. Date: Nov. 30, 2000

(30) Foreign Application Priority Data

May 24, 1999 (FI) .................................. 991180

(51) Int. Cl.
*H04Q 7/00* (2006.01)

(52) U.S. Cl. ...................................... 370/328; 370/401
(58) Field of Classification Search ................ 370/352, 370/466, 328, 329, 330, 343, 345, 349, 401, 370/469; 709/227, 228, 229; 455/41.2, 455/418

See application file for complete search history.

(56) References Cited

U.S. PATENT DOCUMENTS

| 6,018,770 A | 1/2000 | Little et al. ................. 709/223 |
| 6,272,129 B1* | 8/2001 | Dynarski et al. ........... 370/356 |
| 6,366,961 B1* | 4/2002 | Subbiah et al. ............. 709/238 |
| 6,822,954 B1* | 11/2004 | McConnell et al. ........ 370/352 |

FOREIGN PATENT DOCUMENTS

| EP | 0860961 A2 | 8/1998 |
| WO | WO 00/11849 | 3/2000 |
| WO | WO 00/20993 | 4/2000 |

* cited by examiner

*Primary Examiner*—Kwang Bin Yao
(74) *Attorney, Agent, or Firm*—Perman & Green, LLP

(57) ABSTRACT

A method for handling connections in the gateway of a wireless system, such as the WAP system, which gateway maintains certain information of each connection, which information comprises the first part and the second part. Furthermore, the said gateway comprises the gateway aplication and means for the implementation of a certain protocol layer. The method is characterized in that it involves the storing of a partial connection, specific to the gateway application, upon the initiation of the gateway application, in which partial connection the first part of the connection data is fixed. When the datagram arrives from the radio interface at the gateway, a new connection is stored on the basis of the information of the partial connection, in which new connection the said second part of the connection data is fixed, comprising the bearer employed. The invention also relates to the said gateway, a computer program related to the method and a memory in which the said computer program is located.

17 Claims, 6 Drawing Sheets

METHOD AND APPARATUS FOR EFFICIENTLY ENCODING WIRELESS DATA PACKET HEADERS

This application claims the benefit of the earlier filed International Application No. PCT/FI00/00461, International Filing Date, May 22, 2000, which designated the United States of America, and which international application was published under PCT Article 21(2) in English as WO Publication No. WO 00/72537 A1.

BACKGROUND OF THE INVENTION

The present invention relates to wireless data transmission, in particular to the handling of connections in the gateway of the WAP system (Wireless Application Protocol) and of other similar wireless systems.

Wireless communication networks and the Internet network are expanding rapidly and the number of persons using these is also on the increase. The importing of Internet contents and sophisticated data services in digital mobile stations, so-called media telephones, can be implemented using the WAP technology or Nokia's Smart Messaging technology, for example. Although the example referred to below concerns the WAP system, this presentation also applies to other similar systems (Nokia Smart Messaging etc.), which are used to import Internet contents in wireless terminals. Contents that conform to the WAP technology and that have been imported in wireless terminals are generally known as the WAP content. The WAP technology utilises parts of the existing standards. In addition, it comprises own solutions optimised for use with wireless networks. The aim is to support a maximally large number of wireless digital telecommunication networks on a global scale. As the WAP system was developed only recently and as the specifications of the said system in some cases only define the framework for different types of implementation, no solutions are known to exist for implementing certain parts of the system.

The WAP system is based on the joint operation of three components, that is, the WAP terminal 10, the WAP gateway 11 and the origin server 12 (FIG. 1). Correspondingly, the Nokia Smart Messaging system comprises a gateway between the terminal and the origin server, one of the product versions of the said gateway being termed Nokia Artus Messaging Platform. To browse WAP contents, the user has access to the wireless WAP terminal 10 which comprises a WAP browser as the user interface, a micro browser, or some other WAP application that can be used in a WAP terminal. The said WAP terminal can be any appliance which uses the WAP protocol for external communications. The WAP browser is analogous with the web browser.

When the user wants to receive a certain WAP content in his terminal, the effectively encoded request 13 first moves through the radio path to the WAP gateway 11. The said gateway, which comprises coders and decoders, is capable of converting information that conforms to the WAP protocol, such as a WSP (Wireless Session Protocol), to information that conforms to the Internet protocol, such as the HTTP protocol (HyperText Transfer Protocol), and vice versa. Once the gateway receives the aforementioned request from the WAP terminal, it converts it to the request 14, which conforms to the Internet protocol, and sends it to the origin server 12 in which the desired WAP content is located.

The WAP content 15, which is obtained from the origin server as a response to the above request and which can be a WML document (Wireless Markup Language) or WML script document, is sent to the WAP gateway 11 which converts the information that conforms to the Internet protocol to information that conforms to the WAP protocol, such as the WSP protocol. Correspondingly, a HTML document (Hyper Text Markup Language), for example, is converted to a TTML document (Tagged Text Markup Language) in the gateway of the Nokia Smart Messaging system. Next, the gateway 11 sends the WAP content 16, which is effectively coded for the radio path, to the WAP terminal 10. It should be noted that there are typically a number of elements between the WAP gateway and the radio interface in the GSM network (Global System for Mobile communication), for example. The said elements are usually appliances which are located in a mobile services switching centre, a base station controller or a base transceiver station. In the GSM network, the WAP gateway can be connected to the mobile services switching centre or short message service centre. The WAP gateway can be perceived as being in a functional contact with the radio interface.

The block diagram of the WAP gateway 11 is shown in FIG. 2. The gateway comprises the WAP protocol stack 20 which comprises hierarchical WAP protocol layers of which the lowermost WDP layer (Wireless Datagram Protocol) communicates with the wireless network 21. In addition, the gateway comprises the gateway applications 23 in which the requests obtained from the WAP protocol layers and the replies received from the origin servers are handled. The gateway applications normally use a different memory (MEMORY B) 22 than does the WAP protocol stack 20, the memory (MEMORY A) 24 of which contains separate storage blocks reserved for use by different protocol layers.

Physically the gateway can be located in the information network of a telecommunications company. One telecommunications company typically only has one or several WAP gateways each of which serves a large number of customers who utilise WAP services.

Each WAP terminal application typically has at least one session with the WAP gateway, which session should be known to the WAP gateway, that is, stored in its ROM or RAM. The session denotes here communication-related shared information known to both the connection parties, here, the WAP terminal and the WAP gateway. The initiative for opening the session is obtained from the WAP terminal, which terminal typically also launches an initiative for terminating the session. As there may be more than one million sessions to one WAP gateway simultaneously, the problem is the ability of the gateway to handle the enormous quantity of requests which are obtained from terminals, without becoming jammed. There may be a number of requests during one session.

As for its protocols, the WAP system is hierarchical (FIG. 3). The protocol comprises information on the forms of data transmission and on the rules that govern traffic and behaviour in data transmission.

The uppermost layer, the WAE layer 30 (Wireless Application Environment), is not actually a WAP protocol layer, but a broad application environment which is based on WWW (World Wide Web) and mobile station technologies. Below the said WAE layer in the hierarchy lies the uppermost actual protocol layer of the WAP protocol stack, the WSP (Wireless Session Protocol), which comprises session-related services connected with making browser application requests, for example.

The WTP 32 (Wireless Transaction Protocol) beneath the WSP layer is responsible for reliable data transmission, for example. The WTLS layer 33 (Wireless Transport Layer Security) below the WTP layer contains optional services which are connected with the safety of data communication and which the various applications can choose. The lowermost protocol layer, the WDP layer 34 (Wireless Datagram Protocol), in the WAP protocol stack acts above the bearers intended for information transmission In each network, such as the GSM network or the CDMA network (Code Division Multiple Access). Bearers of this kind include short messages (SMS, Short Message Services), data calls (CSD, Circuit Switched Data), packet radio services (GPRS, General Packet Radio Service) and other bearers which are defined in the WAP specifications. Bearers are occasionally also called data carriers (bearers) or trails.

The services and applications 36 that utilise the WAP protocol stack do not necessarily have to use all the protocol layers. Thus an application can, for example, only utilise the lowermost WDP layer through a well-defined interface.

The WAP layers in the WAP gateway implementation are parts of a computer program which is stored in the memory of the gateway. Communication between the layers takes place through the protocol messages 40 (FIG. 4). Typically the upper layer uses the services of the lower layer. The request usually moves in the WAP gateway between layers 31–34 in the protocol stack from down to up, whereas the response moves in the opposite direction. Traffic between the protocol layers is controlled and administered by the control unit 41.

From the point of view of the WAP gateway, a problem is posed by the existence of a number of wireless networks, different network elements that vary according to manufacturer and the establishment of new networks implemented using different technologies that in turn involve different information transfer bearers, for gateway applications and the WAP protocol stack must be able to handle the information which is imported in using different bearers. Addresses, for example, can be presented as a telephone number or an IP number (Internet Protocol), depending on the bearer employed.

One solution to this problem is the use of a connection handle: in a computer program, which controls the operation of the WAP gateway, a connection handle can be assigned to each connection, which connection handle is a numerical connection-specific value in the WAP protocol stack. The connection comprises information on the sender's address (remote address), the sender's application address as a port number (remote port number), the receiver's address (local address), the receiver's application address as a port number (local port number), the stack layers (stack configuration) used and the bearer employed.

The administration and control of the connection handles can be implemented in a centralised manner through the connection handle manager contained in the control unit, which connection handle manager assigns a connection handle to each new connection it has stored and stores the said assigned connection handle in its memory.

In the WAP protocol stack, the connection handle specific to each connection is sent with a protocol message, which travels from one protocol layer to another, to identify the connection with which the said protocol message is connected. When creating protocol objects, the connection handle is stored in the storage block utilised by the layer by which the said protocol object was created. The protocol object denotes the information maintained by the protocol layer with regard to one basic protocol operation. One example of such a basic protocol operation is the WTP layer transaction.

Information on the creation and elimination of protocol objects is sent to the connection handle manager. Using the connection handle saves resources, for now there is no need in the WAP protocol stack to refer to full space-consuming address data. The protocol stack and the gateway applications do not have to be changed either when a new bearer is connected to the stack, for the connection is only identified using the connection handle.

The connection of different bearers to the WAP protocol stack is not a very complex task. It is performed through the API (Application Programming Interface) between the WDP layer and the bearers. Problems are, however, caused by the fact that the gateway does not know before the arrival of the datagram at the WDP layer what type of bearer applicable to data transmission is used at a given point in time. In order to be able to receive the datagram, the application in the gateway must be in a waiting mode in the application address in which the datagram is expected. Otherwise the datagram will be lost. As the datagram should not be lost and as the gateway does not know the bearer beforehand, one solution for ensuring the reception of the datagram is to establish a connection for each bearer connected with the protocol stack, which connection is specific to each gateway application. As there are a number of bearers, a large number of connections must be reserved for each gateway application even if these connections were not used at all. This means a waste of resources

SUMMARY OF THE INVENTION

Now, an invention has been made for restricting in the gateway, such as the WAP gateway, the number of connections to be established.

According to the invention there is provided a method for handling connections in a gateway which is functionally coupled with a radio interface, which gateway maintains certain information on each connection, which information comprises a certain first part and second part and which gateway comprises a gateway application and means for implementation of a certain protocol layer. It is characteristic of the method that in the method a partial connection is stored, specific to the gateway application, after the initiation of the gateway application, in which partial connection the said first part of the connection information is fixed, a connection is stored on the basis of information of the partial connection, upon the arrival of a datagram from the radio interface at the gateway, in which connection the said second part of the connection information is fixed, comprising the bearer employed.

According to the invention there is provided a gateway which is functionally coupled with a radio interface for the communication of messages between a wireless terminal and a server, which gateway comprises a gateway application and a protocol layer for the handling of messages and which gateway maintains certain information on each connection, which information comprises a certain first part and second part. It is characteristic of the gateway that it comprises means for storing a partial connection, specific to the gateway application, as a response to the initiation of the gateway application, in which partial connection the said first part of the connection information is fixed and means for storing the connection on the basis of the information of the partial connection as a response to the arrival of a datagram from the radio interface at the gateway, in which connection the said second part of the connection information is fixed, comprising the bearer employed.

According to the invention there is provided a computer program product executable by means of a computer for the handling of connections in a gateway functionally coupled with a radio interface, which gateway maintains certain information on each connection, which information comprises a certain first part and a second part and which gateway comprises a gateway application and means for implementation of a certain protocol layer. It is characteristic of the computer program product that it comprises means for storing a partial connection, specific to the gateway application, as a response to the initiation of the gateway application, in which partial connection the said first part of the connection information is fixed and means for storing the connection on the basis of the information of the partial connection as a response to the arrival of a datagram from the radio interface at the gateway in which connection the said second part of the connection information is fixed, comprising the bearer employed.

According to the invention there is provided a memory readable by means of a computer, in which memory a computer program has been stored for handling of connections in a gateway functionally coupled with a radio interface, which gateway maintains certain information on each connection, which information comprises a certain first part and a second part, and which gateway comprises a gateway application and means for implementation of a certain protocol layer. It is characteristic of the memory that, in the execution of the computer program a partial connection is stored, specific to the gateway application, upon the initiation of the gateway application, in which partial connection the said first part of the connection information is fixed.

a connection is stored on the basis of the information of the partial connection, upon the arrival of a datagram from the radio interface at the gateway, in which connection the said second part of the connection information is fixed, comprising the bearer employed.

The stated drawbacks can be avoided, according to the invention (FIG. 5), by establishing a partial connection upon the initiation of the gateway application (block 42), in which connection only the receiver's address (local address), the application address (local port number) and the protocol layers (stack configuration) used are stored (block 43) in the memory of the connection handle manager. When the datagram then arrives (block 44), a new connection is established on the basis of the partial connection, in which connection the sender's address, application address and the bearer employed are fixed (block 45). Thus the number of connections can be kept relatively small, as the solution, according to the invention, only requires the establishment of one partial connection for each gateway application, which partial connection comprises information on the basis of which the actual connections are established.

BRIEF DESCRIPTION OF THE DRAWING

In the following, the invention will be described in detail by referring to the enclosed drawings, in which.

DETAILED DESCRIPTION OF THE INVENTION

Figure 1:
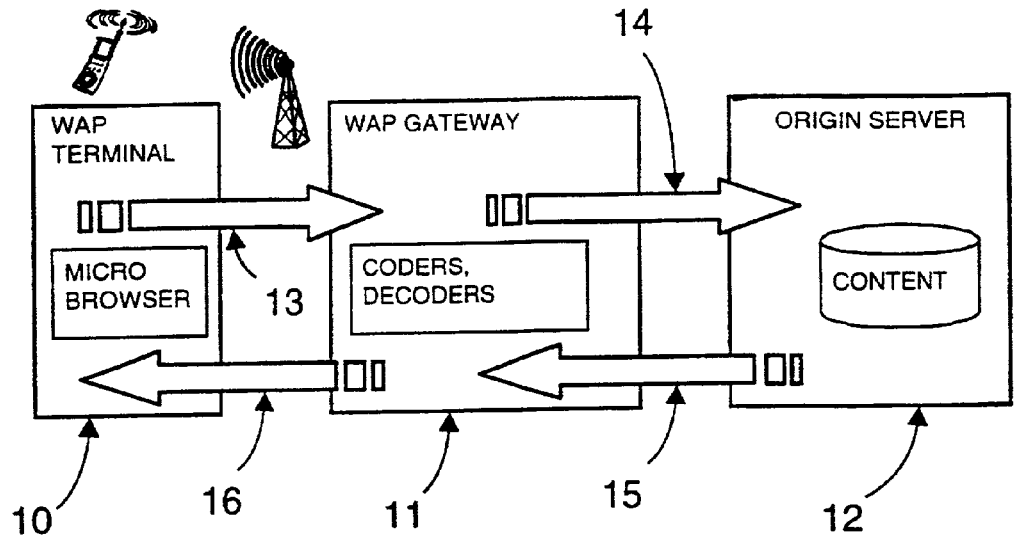
FIG. 1 presents a model of the WAP system.
Figure 3:
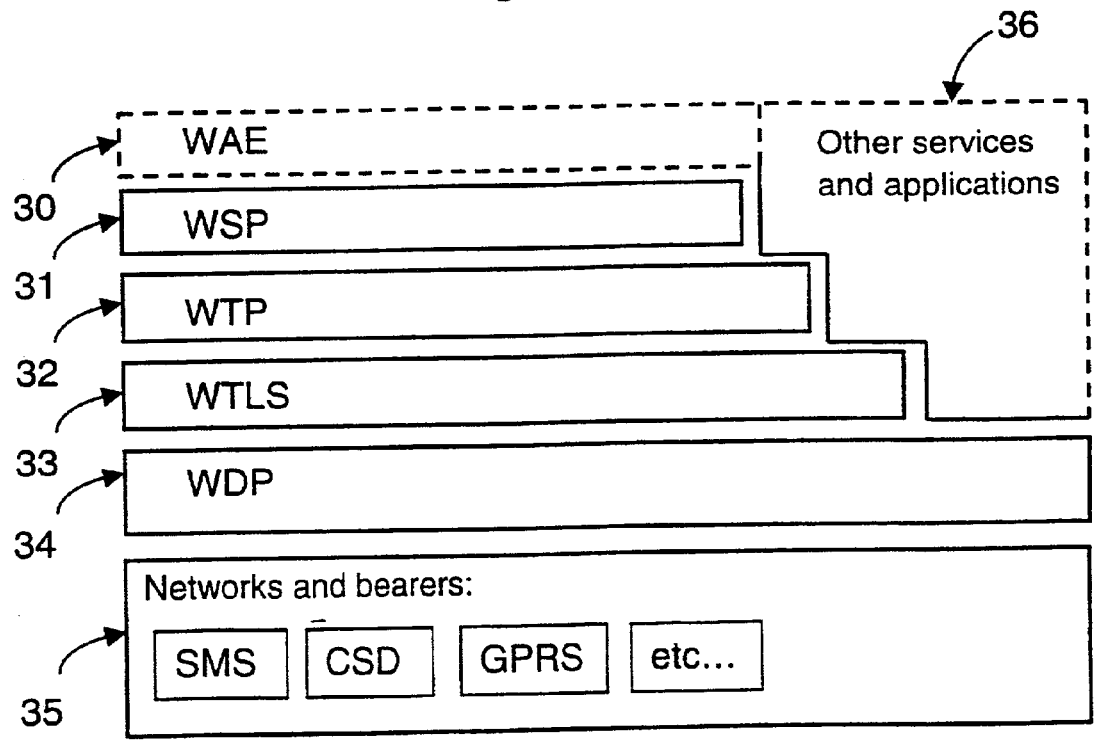
FIG. 3 presents the layers of the hierarchical WAP architecture.
Figure 2:
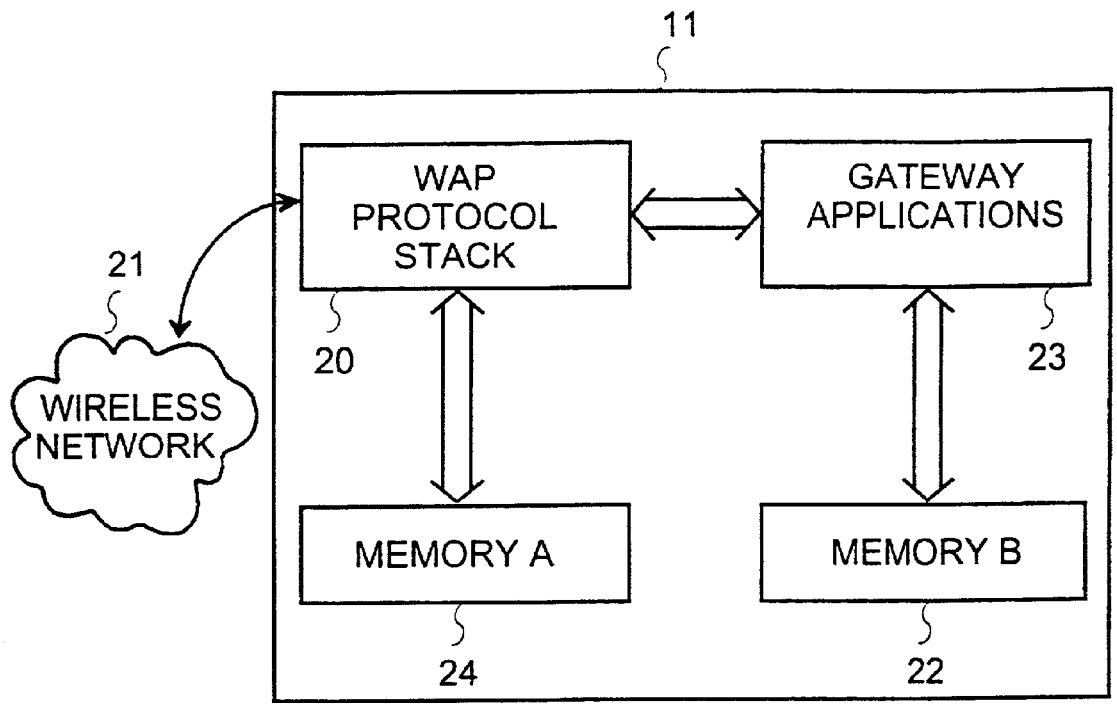
FIG. 2 presents a block diagram of the WAP gateway.
Figure 4:
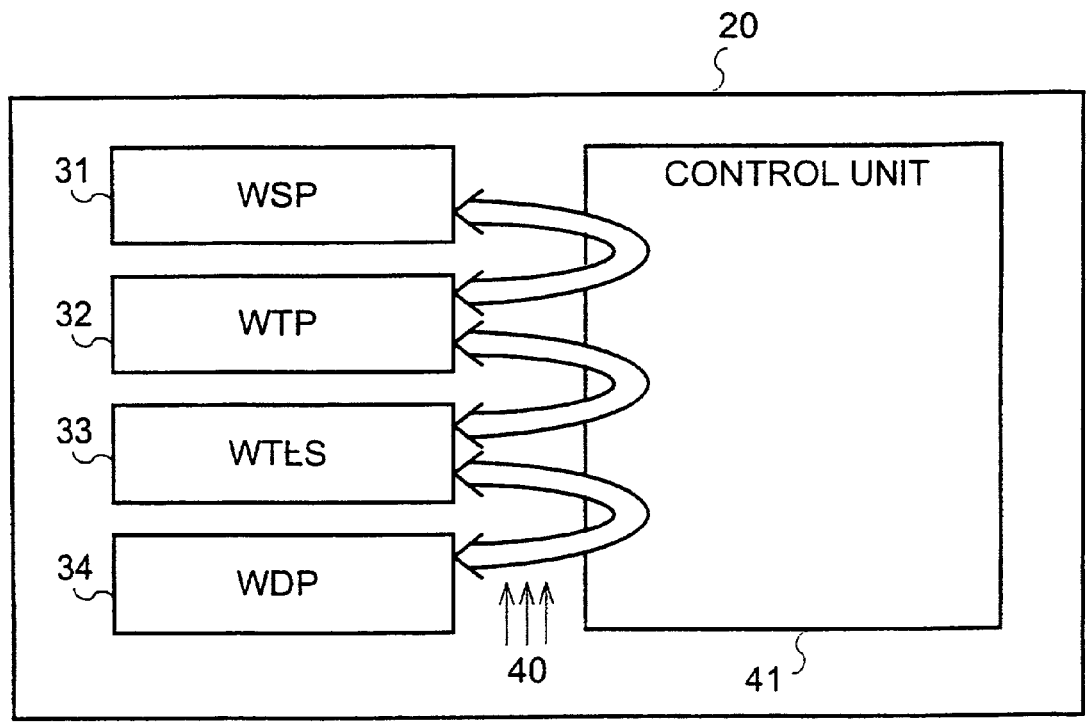
FIG. 4 presents the organisation of the flow of information between the WAP layers.
Figure 5:
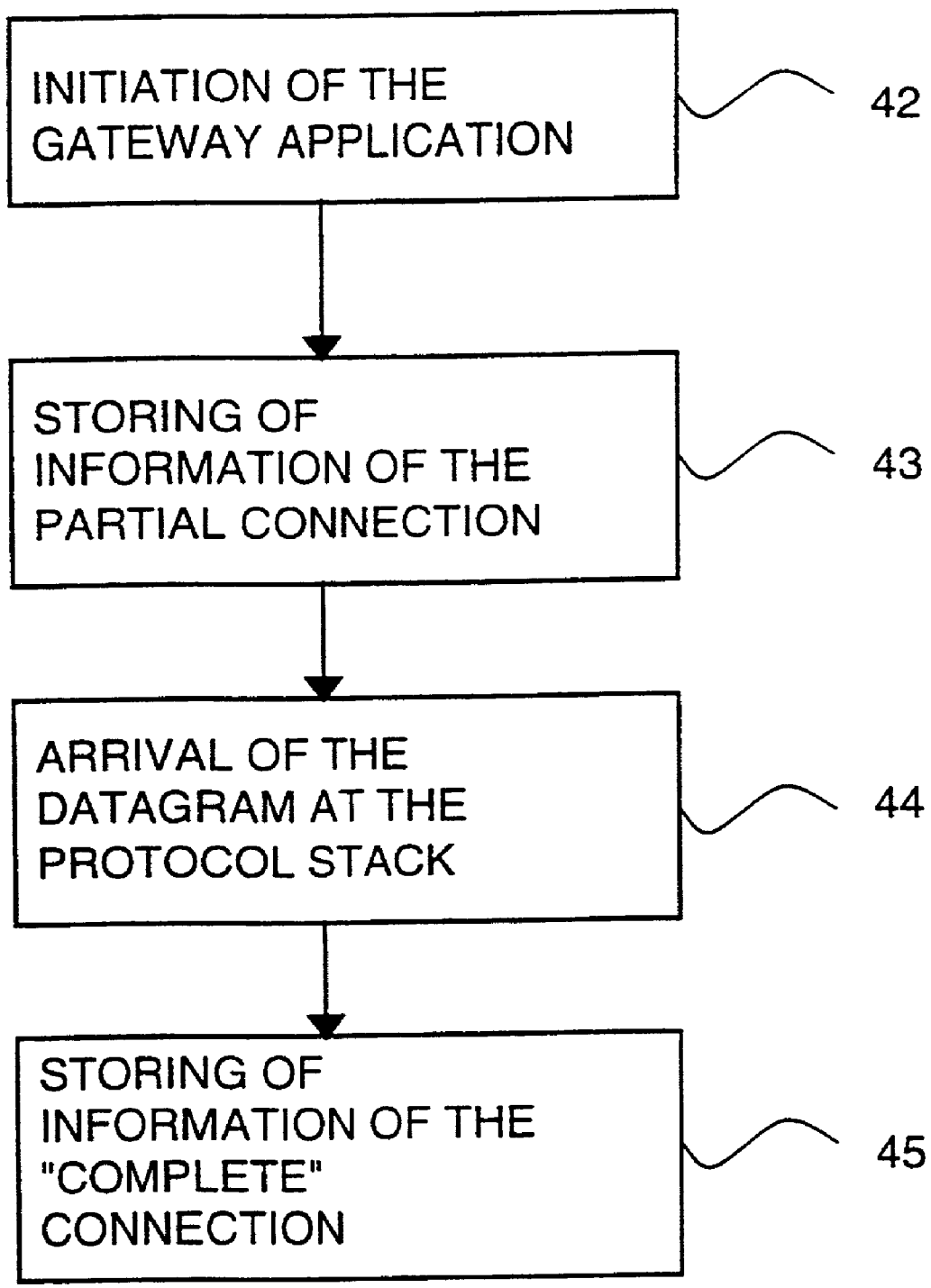
FIG. 5 presents a flowchart which describes the basic principle of the invention.
Figure 6:
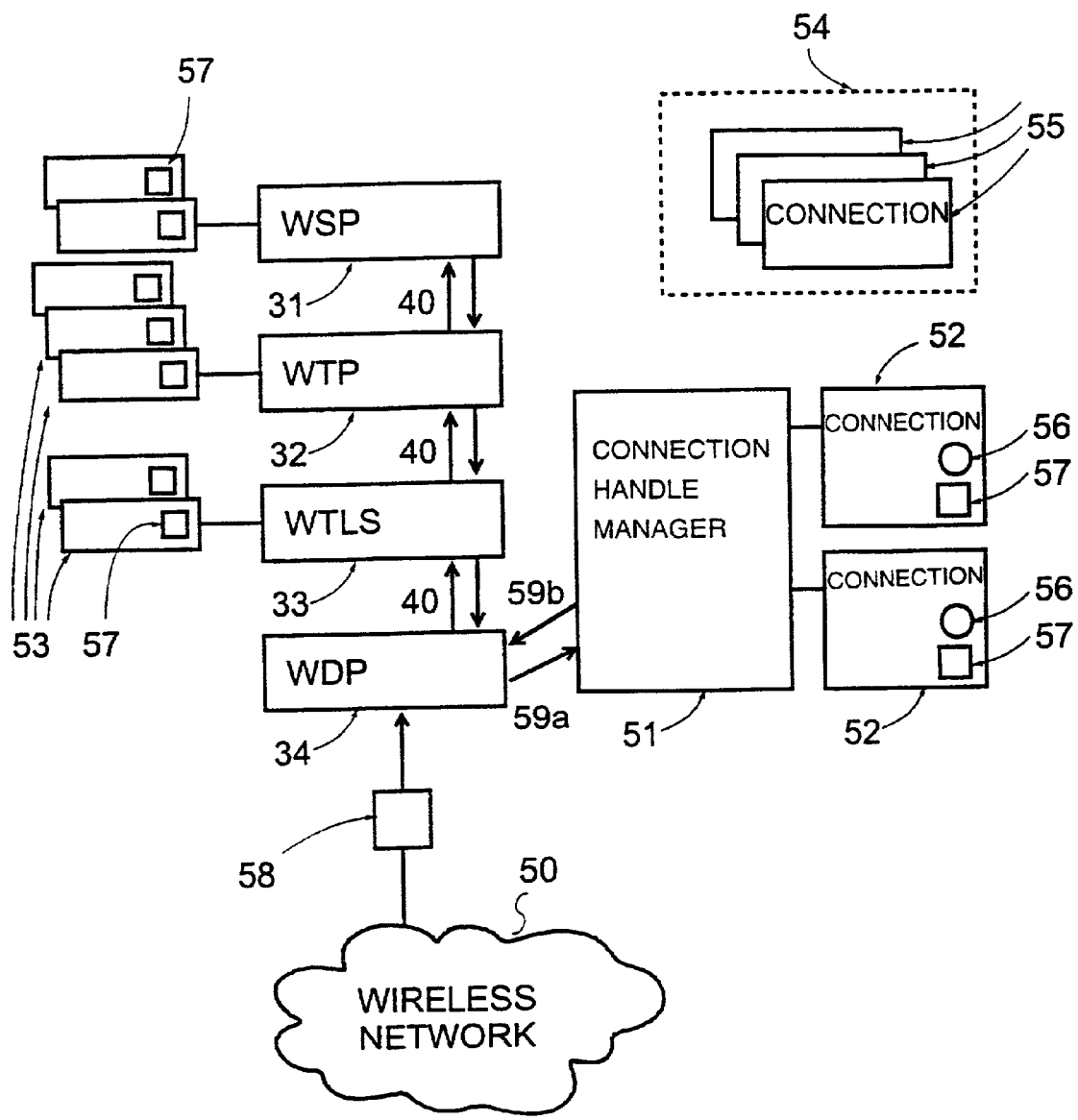
FIG. 6 shows on example of the use of the connection handle.

As it is absolutely essential that the utilisation of connection handles should be understood for the purposes of also understanding the present invention, the use of connection handles will be discussed below in slightly more detail than above (FIG. 6).

Let us assume that the datagram 58 arrives from the telecommunication network 50 in some bearer which is supported by the WAP system, at the WDP layer 34, which is the lowermost layer in the WAP protocol stack. The said datagram can be a request sent from the WAP terminal for retrieving train timetable data or bank account data from the origin server to the WAP terminal. The bearer can be an SMS service in the GSM network in which case the said arriving datagram would be a GSM text message.

The datagram 58 comprises the sender's address (remote address), the application address as a remote port number, the receiver's address (local address), the application address in the form of a local port number and the information to be transmitted. The address data can be composed of telephone numbers or IP numbers (Internet Protocol). The application address determines the application for which the datagram is intended.

The connection data are maintained in a centralised manner in the connection handle manager 51 which is part of the control unit 41. Each connection 52 comprises information on the sender's address (remote address), the sender's application address (remote port number), the receiver's address (local address) and the receiver's application address (local port number), the WAP layers (stack configuration) used and the bearer employed. The connection handle manager also contains, specific to each connection, the value of the reference count 56 which indicates how many WAP protocol layer protocol objects 53 and gateway applications are using the said connection. To identify the connections, the connection handle manager 41 assigns to each connection and stores in its memory 23 the connection handle 57 which is a numeric value, preferably an integer, which is intended for use by the WAP protocol stack and which pertains to each connection.

As the datagram 58 reaches the WDP layer 34, the said layer asks, through the subroutine call 59*a*, from the connection handle manager 51 for the connection handle 57, after which the connection handle manager checks from its memory 24 whether there is already a valid connection 52 in the WAP terminal by which the datagram was sent.

If there is a valid connection 52 in the WAP terminal by which the said datagram was sent, the connection handle manager 51 will send the connection handle 57 of the said connection 52 to the WDP layer 34 as a response 59*b* to the subroutine call 59*a*. If no valid connection exists for the connection information contained in the said datagram, the connection handle manager will retrieve from the connection pool 54 in its memory 24 a free connection 55 and store in it all connection information and the connection handle 57 that it has assigned to the connection (, in which case, as presented in FIG. 6, the free connection 55 will change into connection 52). As a response 59b to the subroutine call 59a, the connection handle 57 assigned to the said connection 52 is sent even in this case. The free connection 55 here denotes a memory space which has not been assigned for use by any existing connection 52.

The information contained in the datagram now moving, through the protocol messages 40, from one protocol layer to another in the WAP protocol stack and to the gateway applications, these protocol messages also carry the connection handle 57 assigned by the connection handle manager to the connection so as to identify that particular connection. Full information on the connection, which corresponds to the connection handle, including address data, are known to the connection handle manager in a centralised manner and are not sent as part of the protocol messages.

When a protocol message that contains connection handle 57 arrives at protocol layer 31–34 and a new protocol object 53, which is specific to protocol layer, is created, the connection handle is always stored in the said protocol object, that is, in the storage block reserved in memory 24 for the relevant protocol layer. The said protocol layer sends information on this to the connection handle manager 51 which increases by one the value of the reference count 56 for the connection 52, which is connected with the connection handle 57.

When the protocol layer 31–34 eliminates a certain protocol object, the said layer informs the connection handle manager 51 of this, which connection handle manager reduces by one the reference count value 56 for the connection 52, which is connected with the said connection handle 57. Each protocol layer 31–34 informs, through subroutine calls, the connection handle manager 51 of changes in the protocol objects 53. If the reference count for any connection 52 receives the value zero, the connection identified by the connection handle 57 will be transferred to free connections 55 in the connection pool 54, for use in some other connection.

If the user of the WAP terminal does not use the terminal, the connection handle connected with this connection can thus be released for use by some other connection. If the same user resumes the use of the same connection, the aforementioned connection handle will be given as the label for the said connection, provided that the connection handle is free. If this is not the case, some other connection handle will be assigned to the connection instead.

Figure 7:
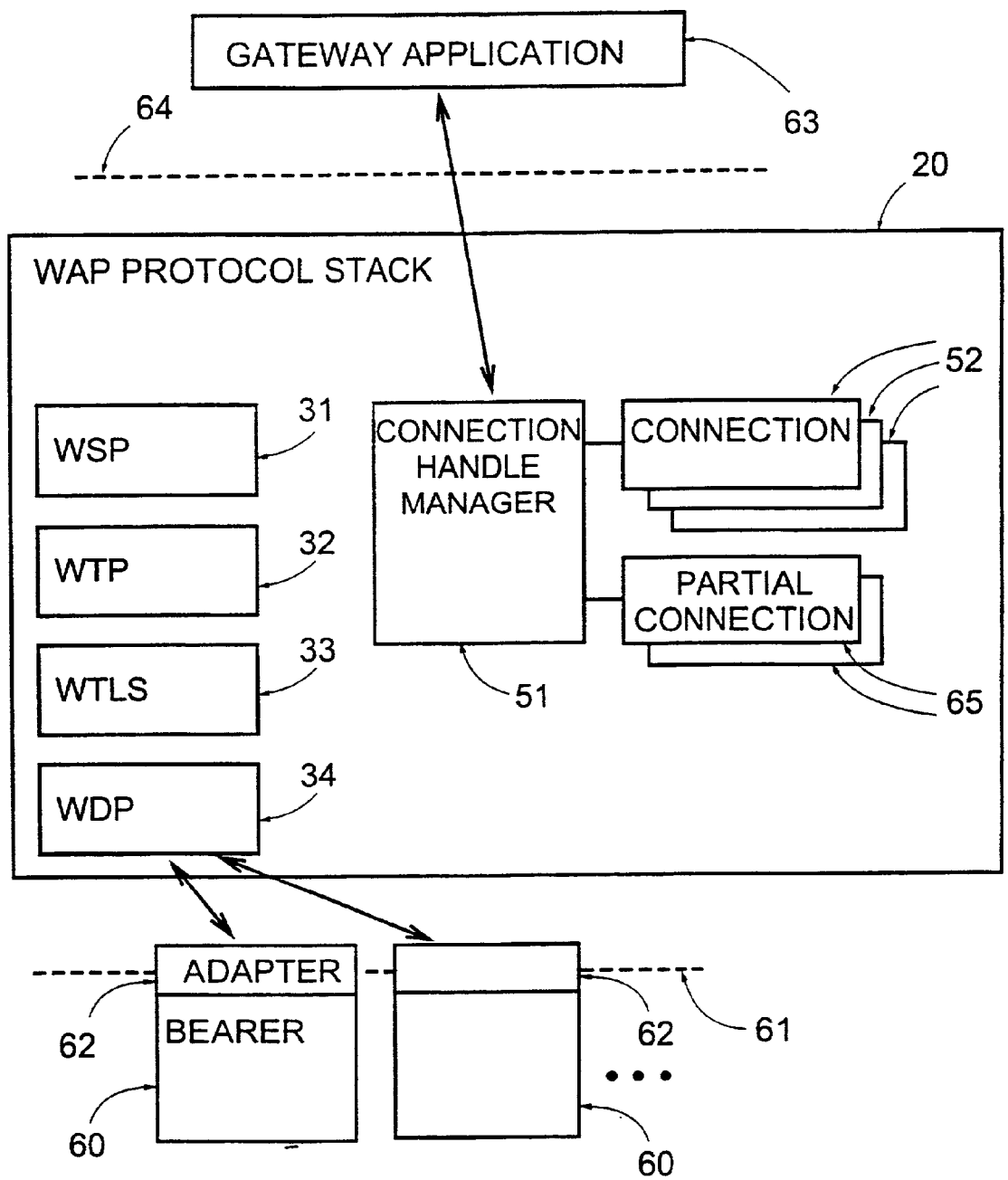
FIG. 7 presents the assembly of a preferable form of execution, according to the invention.

In the first form of execution, according to the invention (FIG. 7), all the known bearers are also known to the WAP protocol stack 20. In other words, the said bearers have been connected to the WAP protocol stack through the API interface 61 which is located between the WDP layer 34 and the bearers 60. The part of the computer program by means of which the API interface 61 is implemented can be termed the bearer adapter 62, for example.

The gateway application 63 in turn utilises upon initiation the API interface 64, which is located between the gateway application and the WAP protocol stack 20, in order to indicate to the connection handle manager 51 that it is ready to serve in a certain local address and application address. In the computer program which controls the operation of the gateway, this takes place preferably through a subroutine call. After this, the application 63 remains in a waiting mode. As a result of the aforementioned measures, the connection handle manager 51 stores in its memory the partial connection 65 in which only the local address, the application address, and the required WAP protocol layers are fixed. The storing of the partial connection 65 in the memory means in practise that a certain kind of a capability is created for the WAP protocol stack to receive the datagram and establish the actual connection. The connection handle manager 51 also assigns a connection handle to each partial connection.

Following the establishment of the said partial connection, the connection handle manager 51 reports to the WDP layer 34 that a gate which corresponds to a certain application address should be opened, for data can only be received through an open gate. The WDP layer opens the said gate for all bearers 60 through the API interface 61 which is located between the WDP layer and each bearer. The API interface comprises a group of subroutine calls which are implemented by a computer program part which can be termed the bearer adapter 62, for example. The said bearer adapter 62 is the basic requirement for the connection of different bearers 60 to the WAP protocol stack 20.

Figure 8:
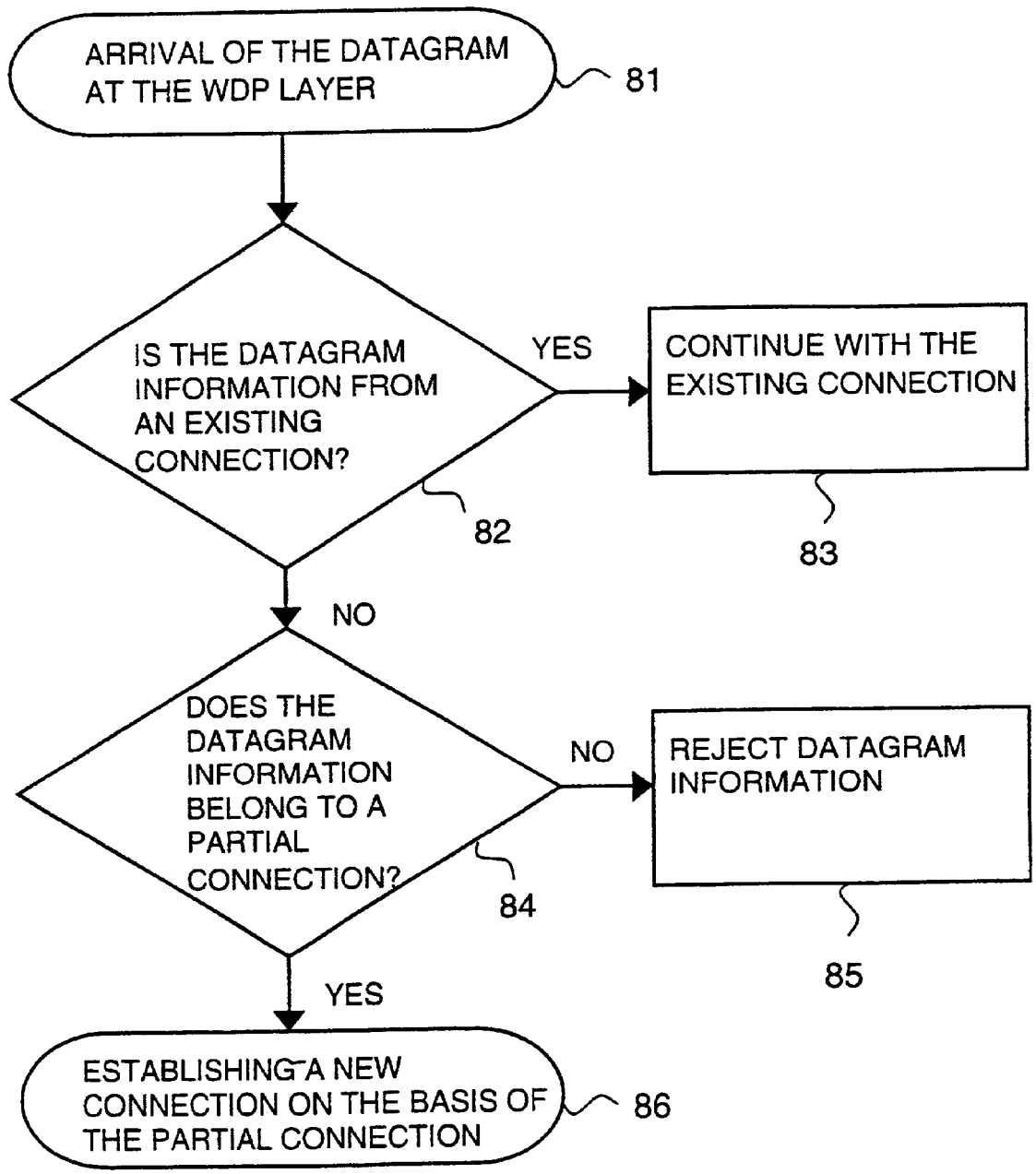
FIG. 8 presents a flowchart regarding certain measures, according the invention, for the administration of the connection.

FIG. 8 shows the measures executed by the protocol stack 20 when a datagram, such as a short message in the GSM network, arrives at the WDP layer 34 (block 81), which is the lowermost layer in the protocol stack. When the datagram reaches, in a bearer 60, the WDP layer in the protocol stack through an opened gate, the WDP layer asks the control handle manager 51 to check if the data are from an existing connection 52 (block 82). This is done by comparing the connection information (address data, bearer, etc.) contained in the datagram with the data on the actual connections 52, which data are contained in the memory of the connection handle manager. If the said data were obtained from an existing connection 52, the connection handle manager 51 will send to the protocol layer 34 a connection handle assigned to the said connection 52, and the operation of the gateway will continue in accordance with the existing connection (block 83).

If the information contained in the datagram is not from an existing connection 52, the connection handle manager 51 will check whether the said information is part of a partial connection 65 (block 84). This is done by comparing the connection information contained in the datagram, preferably the application address, with the information on partial connections 65 which is contained in the memory of the connection handle manager 51. If the said data are from a partial connection, a new connection 52 will be established on the basis of the information of the partial connection 65 (block 86). A connection handle assigned to the new connection 52 is sent to the protocol layer 34. The partial connection 65 is not eliminated upon the establishment of the connection 52, but it remains valid throughout the life span of the said gateway application 63. In both the cases discussed above, the data contained in the datagram are finally guided to the correct gateway application 63 through the protocol layers 34–31.

If no partial connection 65 is available for the aforementioned application address, i.e. port number, there will be no application 63 that could receive the data, in which case the data will be neglected, i.e. rejected (block 85).

The bearer 60 by which the information is carried can be any network bearer which is supported by the WAP system, such as a short message service (SMS, Short Message Service) in a GSM network (Global System for Mobile communication), a data call, i.e. a CSD service (Circuit Switched Data) or a packet radio, i.e., GPRS, service (General Packet Radio Service).

The benefits offered by the invention relate to the use of a partial connection and the connection handle. As only one partial connection is established for each application upon the initiation of the gateway applications, which connection is used as the basis for the establishment of complete connections upon the arrival of the data at the opened gate, the number of the connections in the gateway can be kept relatively small. In addition, the new bearer can be connected to the WAP system without changing the gateway application, for the application does not know, nor does it have to know, the bearer employed. This is extremely important, since the handling of applications is slow and testing time-consuming.

The gateway, according to the invention, can be implemented by means of software. The relevant computer program product can be stored in a data medium, such as a memory, transferred and run in a computer.

The paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A method for handling connections in a gateway which is functionally coupled with a radio interface, which gateway maintains particular information on each connection, which information comprises a particular first part and second part, and which gateway comprises a gateway application and means for implementing a particular protocol layer the method comprising:
    storing, specific to a gateway application, information of a partial connection after the initiation of the gateway application, in which partial connection said first part of the connection information is fixed, and
    storing, upon arrival of a datagram from the radio interface at the gateway, information of a connection on the basis of the information of the partial connection, in which connection said second part of the connection information is fixed, comprising a bearer to be used in the connection.

2. A method according to claim 1, wherein the first part of the connection information comprises information on a receiver's address and application address as well as the protocol layer to be used.

3. A method according to claim 2, wherein the receiver's address comprises a local address and the receiver's application address comprises a port number.

4. A method according to claim 1, wherein said second part of the connection information additionally comprises information on a sender's address and application address.

5. A method according to claim 1, wherein the gateway is a gateway of a WAP (Wireless Application Protocol) system.

6. A method according to claim 5, wherein the gateway application is arranged to communicate timetable services from an origin server to a WAP terminal.

7. A method according to claim 5, wherein the gateway application is arranged to communicate banking services from an origin server to a WAP terminal.

8. A method according to claim 1, wherein said storing is performed by the gateway.

9. A method according to claim 1, wherein said storing of information of a connection on the basis of the information of the partial connection comprises establishing an actual connection based on said partial connection.

10. A method according to claim 1, wherein said first part of the connection information defines said gateway application.

11. A gateway, which is functionally coupled with a radio interface, for communicating messages between a wireless terminal and a server, which gateway comprises a gateway application and means for implementing a protocol layer for handling messages and which gateway is adapted to maintain particular information on each connection, which information comprises a particular first part and a second part, wherein the gateway comprises:
    means for storing, specific to a gateway application, information of a partial connection in response to initiation of the gateway application, in which partial connection said first part of the connection information is fixed, and
    means for storing, in response to arrival of a datagram from the radio interface at the gateway, information of a connection on the basis of the information of the partial connection, in which connection said second part of the connection information is fixed, comprising a bearer to be used.

12. A gateway according to claim 11, wherein said first part of the connection information defines said gateway application.

13. A gateway according to claim 11, wherein said second part of the connection information additionally comprises information on a sender's address and application address.

14. A computer program product executable by means of a computer for handling connections in a gateway functionally coupled with a radio interface, which gateway is adapted to maintain particular information on each connection, which information comprises a particular first part and a second part and which gateway comprises a gateway application and means for implementing a particular protocol layer, wherein the computer program product comprises:
    means for storing, specific to a gateway application, information of a partial connection in response to initiation of the gateway application, in which partial connection said first part of the connection information is fixed, and
    means for storing, in response to arrival of a datagram from the radio interface at the gateway, information of a connection on the basis of the information of the partial connection, in which connection said second part of the connection information is fixed, comprising the bearer to be used.

15. A computer program product according to claim 14, wherein said first part of the connection information defines said gateway application.

16. A computer program product according to claim 14, wherein said second part of the connection information additionally comprises information on a sender's address and application address.

17. A memory readable by means of a computer, in which memory a computer program has been stored for handling connections in a gateway functionally coupled with a radio interface, which gateway is adapted to maintain particular information on each connection, which information comprises a particular first part and a second part, and which gateway comprises a gateway application and means for implementing a particular protocol layer, wherein upon execution of the computer program specific action is caused comprising:

storing, specific to a gateway application, information of a partial connection after initiation of the gateway application, in which partial connection said first part of the connection information is fixed, storing, upon arrival of a datagram from the radio interface at the gateway, information of a connection on the basis of the information of the partial connection, in which connection said second part of the connection information is fixed, comprising a bearer to be used.

* * * * *